United States Patent Office 3,249,861
Patented May 3, 1966

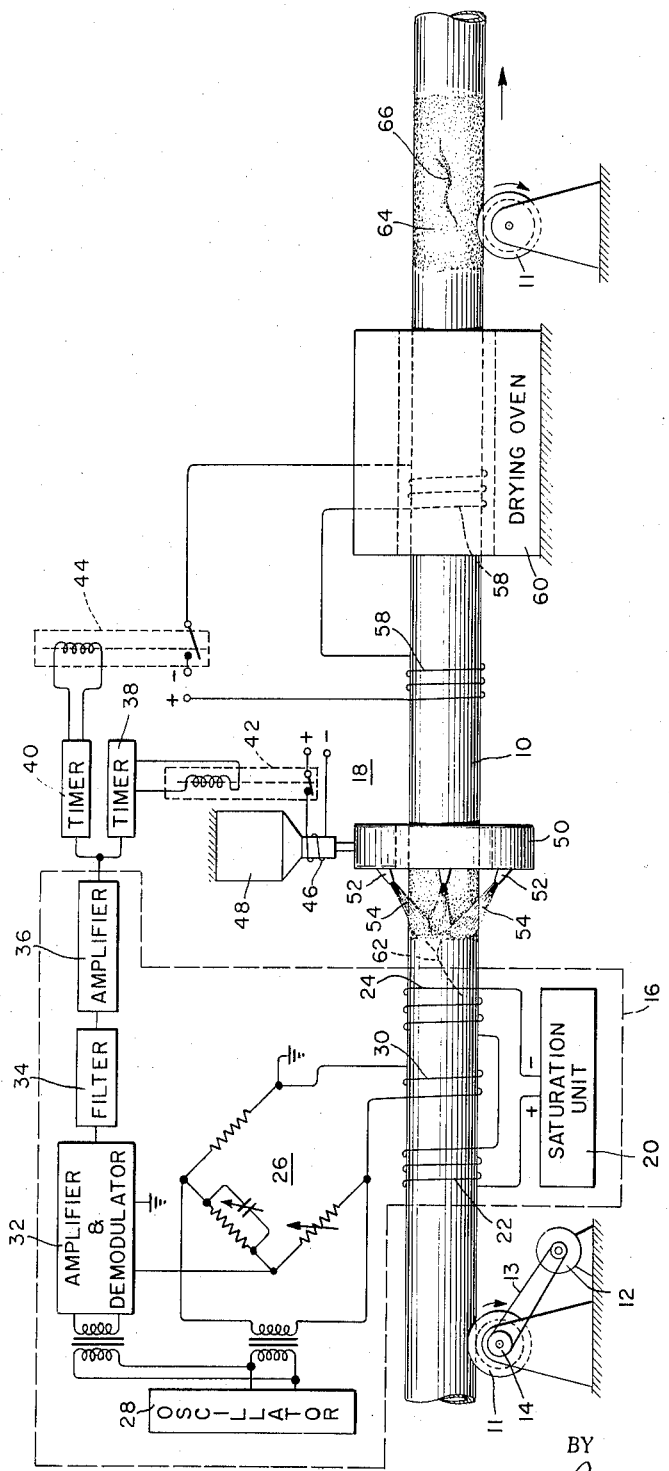

3,249,861
METHOD AND APPARATUS FOR MAGNETIC
FLAW DETECTION BY DEPOSITING MAGNETIC PARTICLES ON ONLY THE AREA OF THE FLAW
Maxwell Pevar, Philadelphia, Pa., assignor to The Budd Company, Philadelphia, Pa., a corporation of Pennsylvania
Filed Sept. 18, 1962, Ser. No. 224,440
7 Claims. (Cl. 324—38)

This invention relates to a method and apparatus for non-destructively testing ferromagnetic articles for irregularities susceptible to detection by the use of magnetic particles and has, among its objects, the provision of improvements which combine the advantages of both electromagnetic testing and magnetic particle testing techniques.

Other objects and advantages of the invention will be apparent from the following description taken in connection with the accompanying drawing which is a schematic diagram of illustrative apparatus embodying the invention.

Although the invention can be used to test ferromagnetic articles of various shapes for the inclusion of irregularities susceptible to forming magnetic particles, upon magnetization of the article, into a pattern indicative of an irregularity, the invention will be disclosed with reference to the testing of an elongated, ferromagnetic pipe for the inclusion of flaws, such as cracks, seams, etc., within the walls of the pipe.

In accordance with one embodiment of the method, a pipe is magnetized by passing successive portions of the pipe through a magnetic field produced by a pair of direct current magnetizing coils. The magnetized portions of the pipe are scanned by a detector having a search coil inductively coupled with magnetized portions whereby a signal is electromagnetically induced in the coil to indicate that a portion of the pipe being scanned by the coil contains a flaw. The generation of a signal can be done either by inducing eddy currents in the pipe by applying a varying magnetic field to the pipe and measuring variations in the back E.M.F. induced in the coil by the eddy currents, or by leakage flux techniques whereby movement of the pipe causes the leakage flux to move relative to the search coil and induce a signal in the coil.

When a flaw has been detected, a visible pattern is produced on the exposed outer surface of that portion of the pipe containing the flaw to indicate the nature and the location of the flaw. This can be accomplished by depositing magnetic particles on that portion of the pipe containing the flaw whereby the leakage flux orients the magnetic particles into a pattern indicative of the nature and location of the flaw. The magnetic particles are deposited in response to each signal and only on that portion of the pipe immediately adjacent to the flaw. Thus, if a long section of the pipe is flawless, no particles will be deposited, whereas if the section contains several longitudinally spaced flaws, the magnetic particles will be deposited on several longitudinally spaced portions of the pipe.

Advantageously, the magnetic particles can be dispersed in a solution of a volatile solvent and a stable, cohesive solute so that upon applying the dispersion to the pipe, the magnetic particles settle into the desired pattern and the solvent volatizes to harden the solute and fix the particles in the desired pattern. The rate of volatization can be increased by increasing the temperature of the dispersion as by passing the pipe through a drying oven. When the pipe material has high retentivity characteristics, the applied magnetic particles settle into the desired pattern and remain in position as the solvent dries. However, when the pipe material has lower retentivity characteristics or the pipe is moved, so that the settled magnetic particles tend to become dislodged and improperly positioned, the pipe can be supplementarily magnetized to hold the magnetic particles in position as the solvent volatizes. The supplementary magnetization can be accomplished by subjecting the pipe to a magnetic field in the same direction as the primary magnetic field.

Referring now to the drawing, there is illustrated one advantageous embodiment of the apparatus of the invention applied to the continuous, in-process, inspection of an elongated ferromagnetic pipe 10 supported by a plurality of rollers 11 for movement in the direction of the arrow along the longitudinal axis of the pipe, one of the rollers being driven by a motor 12, belt 13 and pulley 14 to impart such movement to the pipe.

The inspection apparatus comprises an electromagnetic tester 16 indicated generally by the dotted lines in the drawing and means, indicated generally by reference numeral 18, for depositing a dispersion of magnetic particles on pipe 10 in a manner more fully described hereinafter. The tester and the depositing means can be considered as portions of a pair of longitudinally spaced testing stations through which pipe 10 passes.

Tester 16 can be any one of several well known types which operate by magnetizing portions of the test specimen and by providing an output signal indicating the presence of a flaw within a section of the test specimen. For the purpose of disclosing the invention, tester 16 is illustrated as comprising a saturation unit 20 which includes a pair of longitudinally-spaced, external, magnetizing coils 22 and 24 having internal diameters slightly greater than the outside diameter of the pipe. Coils 22 and 24 are arranged so that successive portions of pipe 10 freely pass through the coils whereby, by passing a direct current through the coils, both of which are wound in the same direction, successive portions of the pipe are magnetized to a point of substantial saturation. The saturation unit is provided because it has been found that when a ferromagnetic material is tested, the effects of internal stresses are quite often stronger than those of the flaws to be detected. By substantially saturating the ferromagnetic member, the effects of internal stresses and other magnetic anisotopes are eliminated and the test signal can penetrate below the surface.

Tester 16 also includes a bridge circuit 26 energized by an oscillator 28, one arm of the bridge circuit being a test or search coil 30. The search coil is an external coil located between magnetizing coils 22 and 24 and is operative, upon energization thereof by an alternating current to induce eddy currents in those adjacent portions of the pipe passing by the coil. The eddy currents induce a back E.M.F. in coil 30 in accordance with the homogeneity of the pipe whereby a flaw induces a characteristic signal in coil 30 and bridge circuit 26 which is fed to an amplitude sensitive amplifier and demodulator 32 that, in turn, feeds to a filter 34 an output signal having an amplitude proportional to the phase modulation in the bridge output signal brought about by a flaw in the pipe.

It has been found that for a given scanning speed, i.e., a uniform speed of pipe 10 past coil 30, certain irregularities, such as flaws or discontinuities, dimensional variations, heat treatment variations, and composition variations, produce characteristic modulating frequencies. Filter 34 passes only those characteristic frequencies associated with the type of irregularity for which the specimen is being tested and suppresses other frequencies. The output from filter 34 is fed into a power amplifier 36 which in turn, feeds an output signal to a pair of timers 38 and 40 that control actuation of a pair of single-pole, single-throw, normally-open relays 42 and 44, respectively.

Relay 42 controls operation of a solenoid operated valve 46 connected to the outlet of a closed, pressurized container 48 containing a dispersion comprising a comminuted magnetic particles dispersoid and a dispersant comprising a solution of a volatile solvent and cohesive stable solute. As an example, the composition of dispersion can be as follows:

|  | cc. |
|---|---|
| Solvent-ethyl alcohol (50% by volume) | 150 |
| Solute, polyvinyl alcohol (resin) | 90 |
| Total dispersant | 240 |
| Dispersoid—iron oxide $Fe_3O_4$ powder (300 mesh) grams | 4 |

The outlet of valve 46 is connected to the inlet of an annular header 50 having a plurality of evenly spaced nozzles 52 arranged to spray the dispersion, as indicated at 54, upon pipe 10 in response to actuation of solenoid valve 46. Timer 38 is constructed and arranged so that each input signal from amplifier 36 causes timer 38 to actuate relay 42 whereby solenoid valve 46 is opened only for a sufficient period of time to cover that portion of the pipe containing the flaw which produced the input signal. The pipe is covered for predetermined longitudinal distances on either side of the flaw to insure that the pattern fully indicates the extent of the flaw. The operation of the timers is obviously dependent on the speed of the pipe, the distance between the spray unit and the search coil and the desired extent of coating the pipe with the magnetic particles. For example, it may be desired to cover the pipe six inches on either side of the longitudinal limits of the flaw. Suppose also that header 50 is located a distance greater than six inches from detector coil 30. Under such circumstances, when a flaw passes beneath coil 30 and induces a signal that is fed to timer 38, the timer does not immediately actuate relay 42 and solenoid valve 46 but delays actuation thereof until that portion of the pipe containing the flaw moves to within six inches of header 50 whereupon the relay and solenoid valve are energized causing that portion of the pipe which contains the flaw to be covered with the dispersion. The relay 42 and solenoid valve 46 remain energized until the flaw has passed through the header and the dispersion has covered six inches beyond the flaw whereupon timer 38 deenergizes relay 42 and thereby closes valve 46 to shut off the dispersion flow.

To increase the rate of volatization of the solvent of the dispersion, a drying oven 60 is provided which is longitudinally spaced along pipe 10 a sufficient distance from header 50 so that by the time the coating of the dispersion has arrived at the drying oven, the magnetic particles have settled into a pattern indicative of the nature and the location of the flaw.

Towards the end of the settling zone, it is sometimes advantageous to supplementarily magnetize the pipe and thereby increase the strength of the leakage flux to hold settled particles in place. To provide such supplementary magnetization, a pair of coils 58 are located one at the end of the settling zone and the other in the drying oven, and are operated in response to actuation of relay 44 as controlled by timer 40. In order to conserve power, timer 40 is advantageously constructed and arranged so that coils 58 are energized only while a dispersion coating is passing through the settling zone and drying oven. If the particles have not fully settled, the supplementary field tends to hasten the settling action.

In operation, suppose that a defect, indicated by number 62, is included within pipe 10. As that portion of the pipe which contains defect 62 passes through the fields of magnetizing coils 22 and 24, the portion is magnetized to a level of substantial saturation. When defect 62 passes through coil 30, a signal is induced in coil 30 and the signal is fed to timer 38 in the manner previously indicated. Timer 38 delays energization of relay 42 until the defect has approached to within a predetermined distance of header 50 whereupon relay 42 is energized to actuate solenoid valve 46 and thereby spray the dispersion 54 on pipe 10. After the defect 62 has passed through header 50, timer 38 deenergizes solenoid 42 and thereby shuts off the flow of the dispersion. The deposited coating then passes through the settling zone wherein the leakage flux in the pipe causes the magnetic particles to settle into a pattern indicative of the nature and radial location of flaw 62. Thereafter, the solvent is completely volatized in oven 60 leaving a coating, such as indicated at 64, containing a pattern, such as indicated at 66, indicative of the flaw, the coating being removable from the pipe to provide a permanent record of the particular flaw.

It should be noted that the specified illustrated apparatus is advantageous in the following aspects. Coil 30, because of its configuration, is capable only of detecting the longitudinal location of the flaw, so that by the further use of the magnetic particles, the exact longitudinal and radial location of the flaw along with some indication of the nature of the flaw, such as that the flaw is a crack or other characteristic irregularity is provided.

Furthermore, the length of the members which can be tested using a given amount of dispersion is considerably greater than in the case where magnetic particles are continuously applied to the pipe regardless of whether or not it contains a flaw. This increase is obtained since the magnetic particles are put on only those portions of the pipe which contain a flaw.

It will be apparent to those skilled in the art that many changes can be made in the details and arangement of the parts and of the steps without departing from the scope of the invention as defined in the appended claims.

What is claimed is:

1. A method for testing a ferromagnetic member for flaws, comprising: inducing a magnetic field in said member whereby each flaw produces an irregularity in said field by leakage flux on the surface of the member adjacent the flaw; electromagnetically detecting which portions of said member contain flaws; and producing, on the surface of each portion in which a flaw is detected, a pattern indicative of the nature and location of each flaw by depositing, on such surface only, magnetic particles that are oriented by the magnetic field into said pattern.

2. A method for non-destructively testing a ferromagnetic member for discontinuities, comprising: magnetizing said member whereby each discontinuity produces leakage flux at the portion of the surface of said member adjacent to the discontinuity; electromagnetically detecting each discontinuity to determine which portion of the surface of said member is adjacent thereto; and applying to only each portion thus determined magnetic particles that are oriented by the leakage flux due to the adjacent discontinuity into a pattern indicative of the nature and location of the discontinuity.

3. A method for non-destructively testing a ferromagnetic member for discontinuities, comprising: applying a magnetizing force to said member to produce leakage flux at each portion of the surface of said member which is adjacent to each discontinuity; electromagnetically determining the location of each such portion; and producing a pattern indicative of the nature and location of each discontinuity by coating, concurrently with said magnetizing force, on the portion of said surface adjacent thereto, magnetic particles that are oriented by the leakage flux induced by said magnetizing force, said coating being a dispersion that comprises said magnetic particles and a dispersant solution of a volatile solvent and a stable cohesive solute.

4. For testing a ferromagnetic member for discontinuities therein, the combination of: magnetizing means for magnetizing said member; a supply of magnetic particles; means for electromagnetically detecting the locality of a discontinuity in said member and producing an electric signal in response thereto; selectively operable means for depositing said particles on localized areas of said member; and means for operating said selectively operable means in response to said electrical signal to deposit said magnetic particles on the surface of said member at said locality of said discontinuity to form a pattern due to leakage flux in the member caused by magnetization thereof indicative of the nature and location of a flaw.

5. Apparatus for non-destructively testing a ferromagnetic member for flaws, comprising, in combination: means for magnetizing said member; means, including a search coil adapted to be inductively coupled with said member, for scanning successive portions said member and producing an electrical signal in response to each flaw within said portions; selectively operable means for depositing magnetic particles on localized areas of said member; and means for operating said selectively operable means in response to said electrical signal to deposit said particles on the localized area from which said signal is derived to form a pattern due to leakage flux in the member caused by magnetization thereof indicative of the nature and location of a flaw.

6. For testing an elongated ferromagnetic member for discontinuities therein, the combination of: means for moving said member longitudinally through first and second stations; first coil means located at said first station for magnetizing said member whereby each discontinuity causes leakage flux in the vicinity thereof; means, including search coil means, located at said first station, for detecting the locality of each discontinuity and producing an electrical signal in response thereto; selectively operable dispensing means for dispensing a liquid dispersion containing magnetic particles on localized areas of said member at said second station; and means for operating said dispensing means in response to each electrical signal to coat said member with said dispersion only at said locality of each discontinuity to form a pattern due to leakage flux in the member caused by magnetization thereof indicative of the nature and location of a flaw.

7. Apparatus for testing an elongated ferromagnetic article comprising:
an electromagnetic tester;
means adapted to move the article longitudinally past said tester;
said tester including magnetizing means for magnetizing the article and a search coil inductively coupled to the article for scanning successive portions thereof, said search coil being operative to produce a signal indicative of the presence of a flaw within that portion of the article being scanned by the search coil;
selectively operable means for depositing on those portions of the article which have passed said tester magnetic particles capable of forming a pattern, due to leakage flux in the article caused by magnetization thereof, indicative of the nature and the location of a flaw;
and means connected to said search coil for operating said selectively operable means in response to each signal, said last means including timer means for operating said selectively operable means for a period of time greater than that necessary to cover only the exposed surface overlying a flaw but less than that necessary to cover the length of the article.

References Cited by the Examiner
UNITED STATES PATENTS

| | | | |
|---|---|---|---|
| 2,057,091 | 10/1936 | Eurich et al. | 324—38 |
| 2,216,600 | 10/1940 | Moore | 324—38 |
| 2,678,421 | 5/1954 | Dunsheath | 324—38 |
| 2,842,292 | 7/1958 | Bettison et al. | 324—37 |
| 2,895,851 | 7/1959 | Johnson | 324—38 |
| 2,930,972 | 3/1960 | Taylor | 324—38 |
| 2,971,150 | 2/1961 | Prindle | 324—40 |

RICHARD B. WILKINSON, *Primary Examiner.*

WALTER L. CARLSON, *Examiner.*

F. A. SEEMAR, R. J. CORCORAN,
*Assistant Examiners.*